Figure 1:
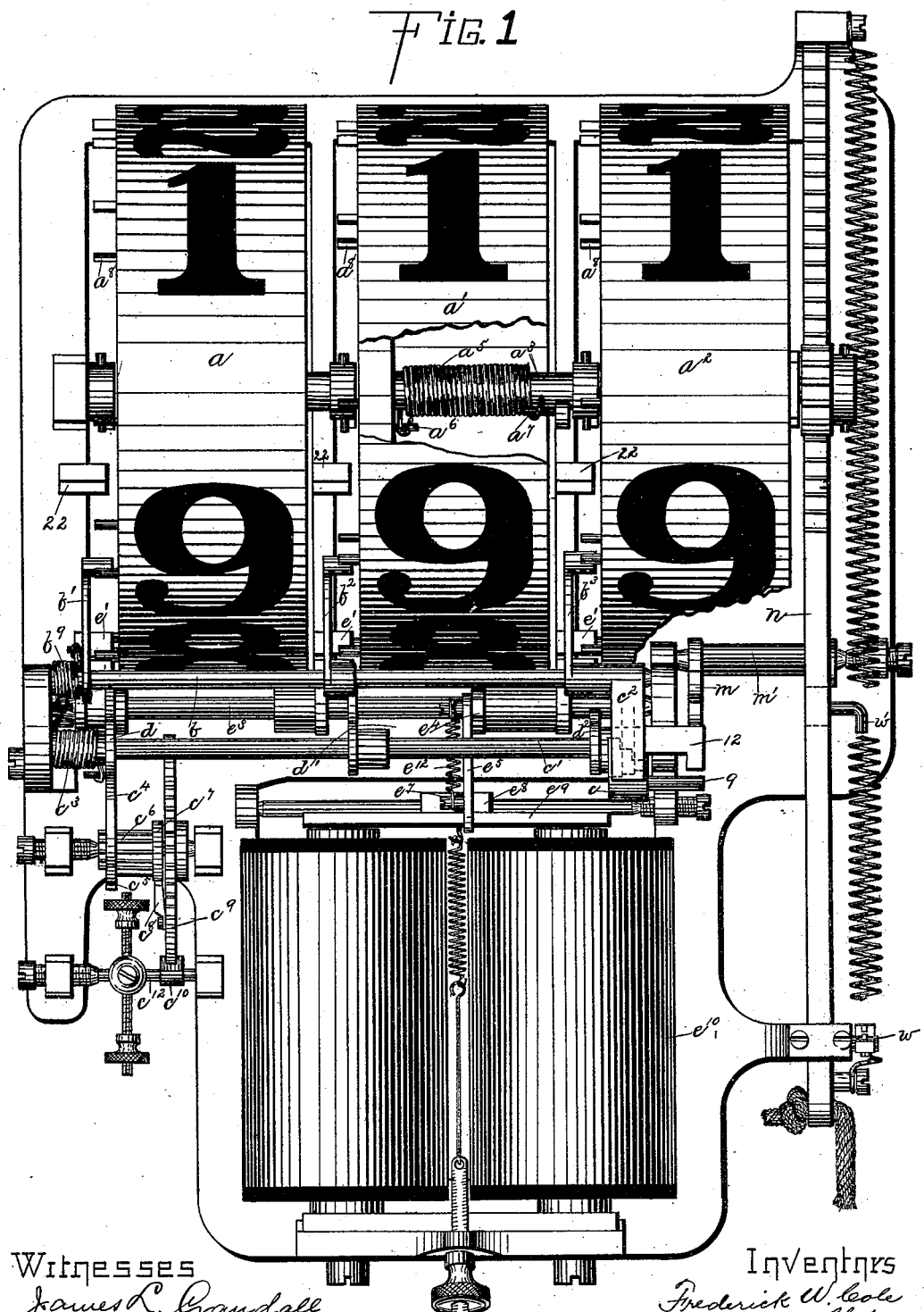

(No Model.) 4 Sheets—Sheet 1.

F. W. COLE & W. M. CHAPMAN.
ELECTRIC VISUAL INDICATOR.

No. 555,076. Patented Feb. 25, 1896.

Witnesses
James L. Crandall
Lucy F. Graves.

Inventors
Frederick W. Cole
Winthrop M. Chapman,
by B. J. Hayes atty.

(No Model.) 4 Sheets—Sheet 3.

F. W. COLE & W. M. CHAPMAN.
ELECTRIC VISUAL INDICATOR.

No. 555,076. Patented Feb. 25, 1896.

Witnesses
James L. Crandall
Lucy F. Graves

Inventors
Frederick W. Cole
Winthrop M. Chapman.
by B. J. Noyes,
Atty.

(No Model.) 4 Sheets—Sheet 4.
F. W. COLE & W. M. CHAPMAN.
ELECTRIC VISUAL INDICATOR.
No. 555,076. Patented Feb. 25, 1896.
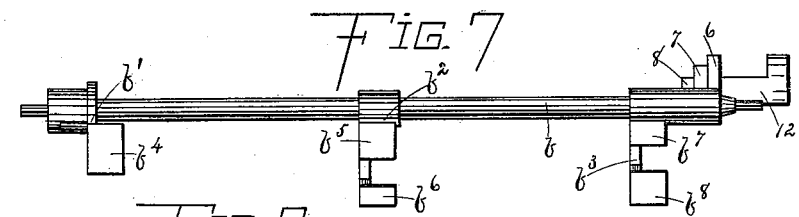
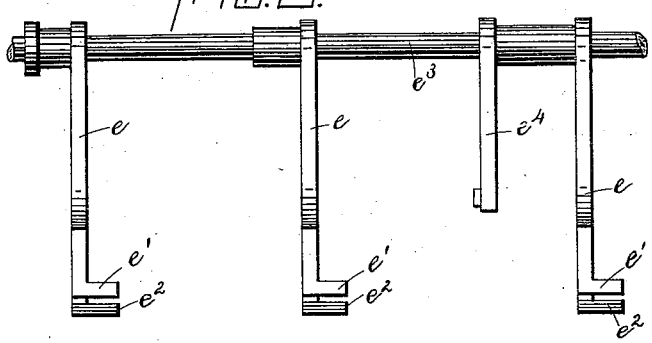
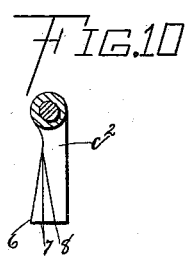
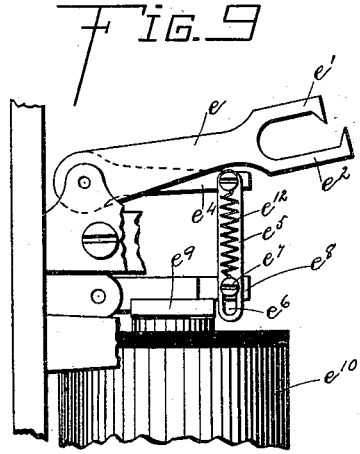
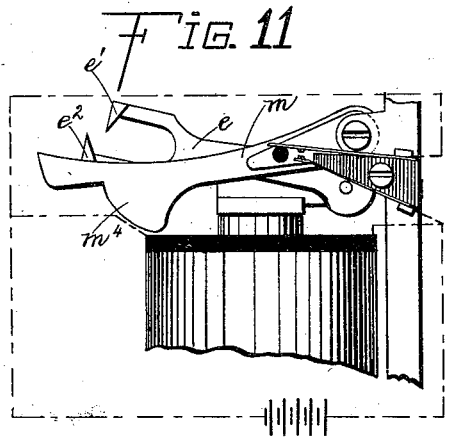
Witnesses
James L. Crandall
Lucy F. Gravel
Inventors
Frederick W. Cole
Winthrop M. Chapman,
by B. J. Hayes,
atty.

UNITED STATES PATENT OFFICE.

FREDERICK W. COLE, OF NEWTON, AND WINTHROP M. CHAPMAN, OF NEEDHAM, MASSACHUSETTS.

ELECTRIC VISUAL INDICATOR.

SPECIFICATION forming part of Letters Patent No. 555,076, dated February 25, 1896.

Application filed June 3, 1892. Serial No. 435,403. (No model.)

*To all whom it may concern:*

Be it known that we, FREDERICK W. COLE, of Newton, in the county of Middlesex, and WINTHROP M. CHAPMAN, of Needham, in the county of Norfolk, State of Massachusetts, have invented an Improvement in Electric Visual Indicators, of which the following description, in connection with the accompanying drawings, is a specification, like letters and numerals on the drawings representing like parts.

This invention relates to electric visual indicators wherein several indicating surfaces or drums are made independently movable back of an opening in the front wall or face of the inclosing case, which opening is preferably fitted with a glass plate and is made of suitable length and width to expose to view one indicator or figure on each drum.

In accordance with this invention the indicating surfaces or drums are actuated by springs or equivalents, and let-offs are provided for them which are operated simultaneously by an electromagnet, thereby permitting or causing the said indicating surfaces or drums to operate intermittingly.

Suitable retaining devices are provided for the indicating surfaces or drums, which are so constructed and arranged as to permit but one drum to operate at a time, the remaining drums being retained or locked either in their normal positions of rest or in their "set-up" positions, as the case may be.

A step-by-step controlling device is provided for the retaining devices, which determines their position, and said device is governed by a timing mechanism or retarding device, so that the intermittingly-operating indicating surfaces or drums will be operated successively, or one after another.

The retarding device or timing mechanism which controls the successive operation of the drums is herein represented as one which retards the progress or advance of the step-by-step controller, but permits it to be restored or turned backward freely or unrestrained, and said retarding device or timing mechanism is permitted or caused to operate or be set in operation by the first movement of that indicating-surface which operates in response to the first impulse received.

The indicating surfaces or drums are represented as having laterally-projecting pins with which the let-offs co-operate, and for simplicity the retaining devices are made to co-operate with the same pins, and as the retarding device or timing mechanism is herein designed to be set back or wound up by the indicating surfaces or drums when operating the said pins are also employed to accomplish this result.

Suitable stops are provided for the moving parts, and also suitable restoring devices, which are adapted to be operated by a pull-bar—as a rack, for instance—or other hand-operated mechanism, so that after the indicating surfaces or drums have been set up by the operation of the electromagnet they may be restored by hand.

Figure 2:
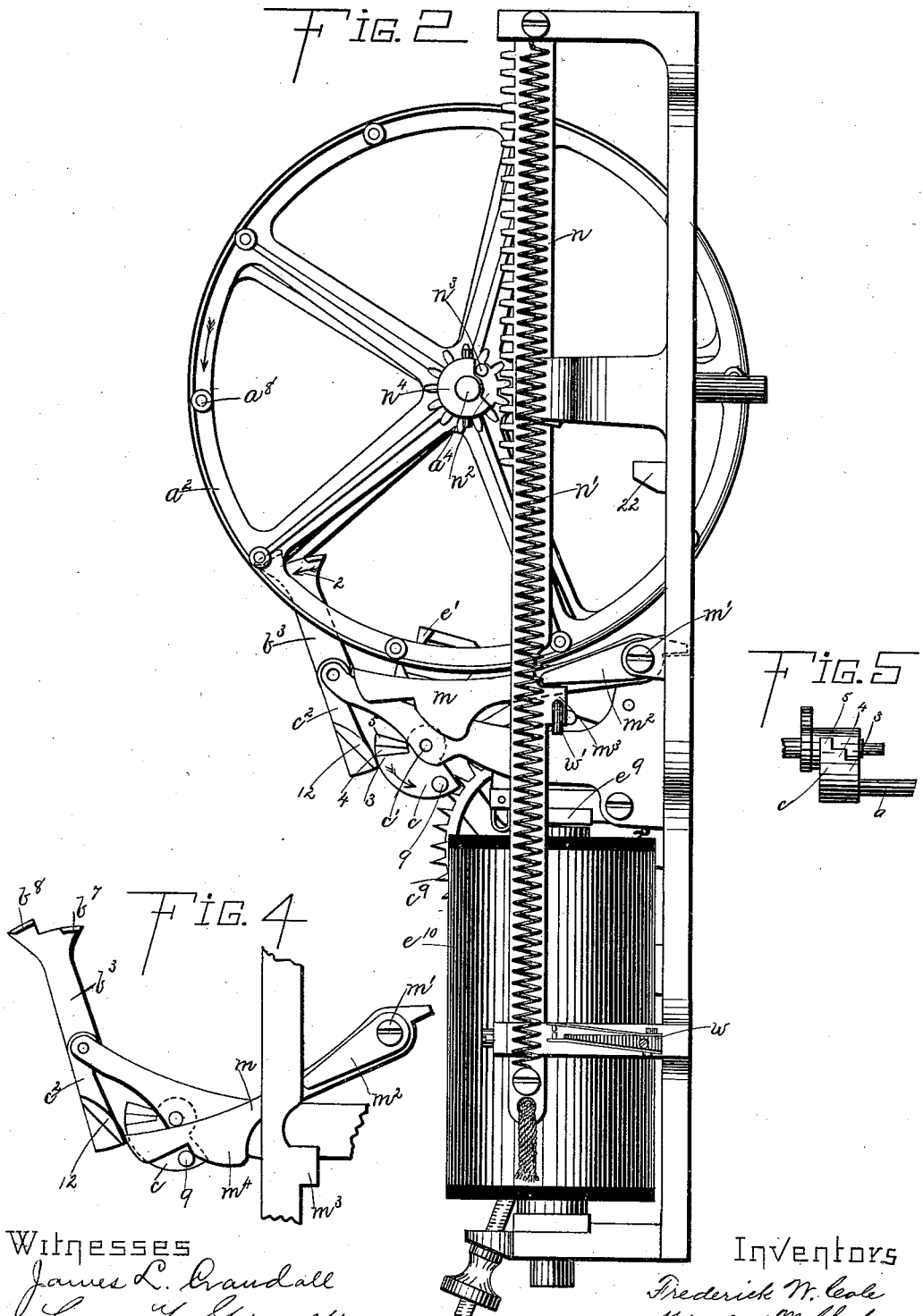
Figure 3:
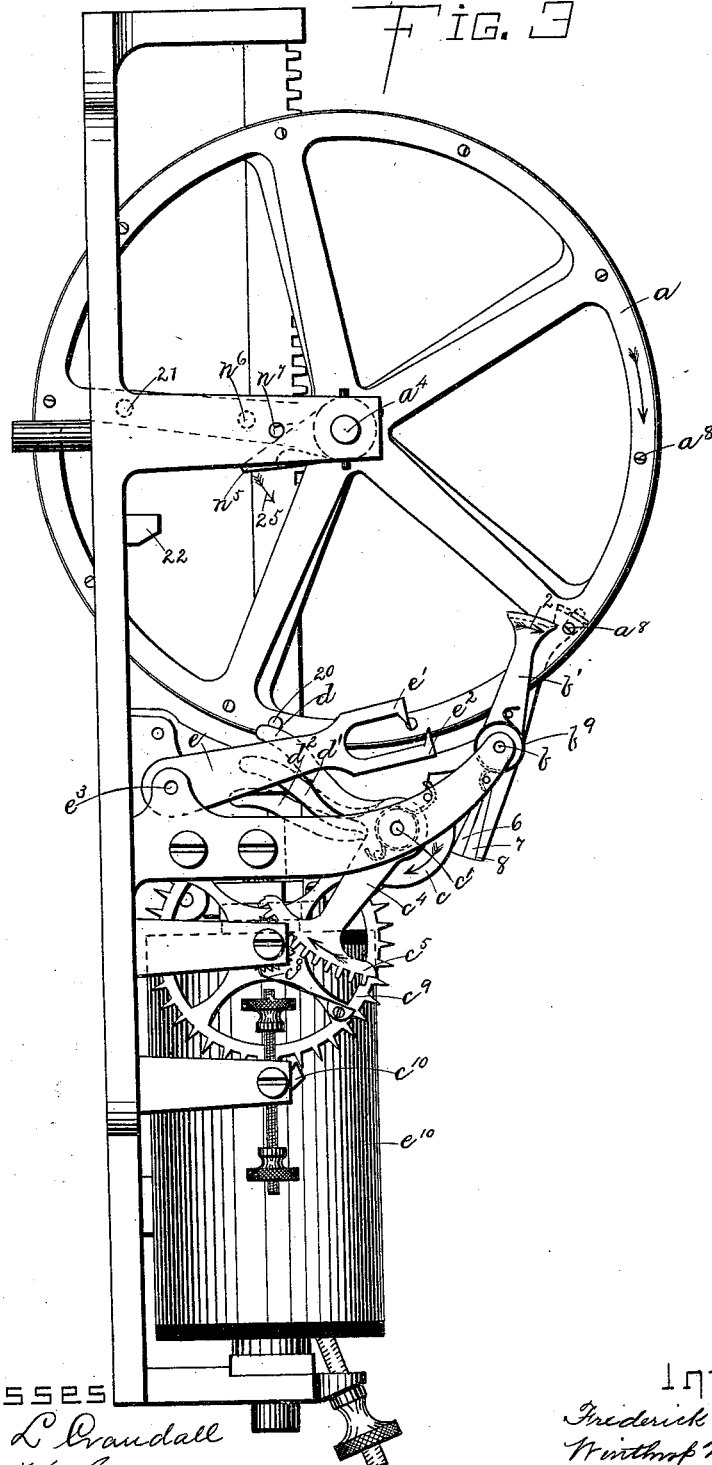

Figure 1 shows in front view an electric visual indicator embodying this invention removed from its inclosing case; Fig. 2, a right-hand side view of the indicator shown in Fig. 1; Fig. 3, a left-hand side view of the indicator shown in Fig. 1; Fig. 4, a detail of some of the restoring devices to be referred to; Fig. 5, a detail of a portion of the step-by-step controlling device to be referred to; Fig. 6, a detail of the shaft carrying the restoring devices for the drums; Fig. 7, a detail of the shaft carrying the retaining devices for the drums; Fig. 8, a detail of the shaft carrying the let-offs for the drums; Fig. 9, a detail showing the loose or flexible connection by means of which the armature is connected with the shaft carrying the let-offs, as well as one of the let-offs; Fig. 10, a detail of the stepped arm on the shaft carrying the retaining devices, and Fig. 11 a modification to be referred to.

The indicating-surfaces upon which the figures or other indications are marked are herein represented as drums and as three in number, $a$ $a'$ $a^2$, secured to like and independent sleeves $a^3$, mounted on a single shaft $a^4$, having its bearings in the framework of the apparatus. A sufficiently-strong spiral spring $a^5$ encircles each sleeve $a^3$, one end of which is attached to a pin $a^6$, projecting from and fixed to the interior of the drum, and the other end to a pin $a^7$, projecting from and fixed to an outwardly-extended projection on the framework. These springs $a^5$ serve as the actuating-springs for the indicating surfaces or drums.

Each drum has arranged on its periphery nine figures at equal or regular distances apart, and also a blank space of a width equal to the space occupied by one of the figures, thereby dividing the peripheries of the drums into ten equal sections each. Several pins $a^8$ project laterally from one side of each drum, they being arranged at equal distances apart and corresponding in number to the number of figures or other indications on the drums and the blank spaces, so that, as herein represented, ten pins $a^8$ are provided on each drum. The let-offs for the drums in this instance are all made alike, or substantially so, and are moved simultaneously, they each being composed of an arm $e$, having two detents at the outer end, one of the detents, as $e'$, being made shorter than its fellow detent $e^2$. The let-offs $e$, three in number, are secured to a shaft $e^3$, (see Fig. 8,) having suitable bearings in the framework and are arranged to co-operate with the pins $a^8$ of the drums.

To the shaft $e^3$ a suitable arm or projection $e^4$ is secured, to the outer end of which one end of a link $e^5$ is connected, the opposite end of which link is slotted, as at $e^6$, Fig. 9, to receive a stud $e^7$ on the lever $e^8$, which supports the armature $e^9$ of an electromagnet $e^{10}$, or it may be on the armature direct, and a spring $e^{12}$ is also connected at one end to the arm $e^4$ and at the opposite end to the stud $e^7$, so that the connection between the armature $e^8$ and arm $e^4$ is flexible or loose for purposes to be hereinafter described.

As the armature retracts, the shaft $e^3$, which is connected with said armature by the arm $e^4$ and link and spring, is slightly but positively rocked, and all the detent-arms or let-offs correspondingly moved, and as the armature attracts, the shaft $e^3$ and let-offs attached to it are returned to their normal position.

If one of the pins $a^8$ on one of the drums should bear against the detent $e'$ when the armature retracts, said pin will pass by said detent $e'$ and the next pin will be brought to bear against the detent $e^2$, and when said armature attracts, the pin $a^8$, which is bearing against the detent $e^2$, will pass by said detent and abut against the detent $e'$, so that it will be seen that a complete go-and-return movement of the armature is necessary to release each pin and advance the drum one step, or, in other words, the circuit must be changed and restored to its normal condition for the release of each pin. Thus it will be seen that all the let-offs are not only alike, but that all are moved simultaneously.

A shaft $b$ is supported in suitable bearings on the framework parallel to the shaft $e^3$, which has fixed to it suitable retaining devices for the drums, there being three herein shown, as $b'$ $b^2$ $b^3$, one for each drum, and for simplicity they are arranged to co-operate with the said pins $a^8$. These retaining devices are provided for the drums, and are adapted to be moved, as will be described, so that as the let-offs are moved simultaneously the drums will be released successively or one at a time.

The retaining device $b'$ consists of an arm secured to the shaft $b$, having on its outer end a lateral extension or projection $b^4$, made quite wide and having a slightly-convex or flat surface, said projection being adapted to obstruct the path of movement of the pins $a^8$ on the drum $a$. The said projection $b^4$ is made of such width as to be removed from said path of movement of the pins $a^8$ by a slight rotary motion of the shaft $b$ to thereby permit the release or escape of said pins.

The retaining device $b^2$ consists of an arm likewise secured to the shaft $b$, having on its outer end two lateral extensions or projections $b^5$ $b^6$ with a narrow space between them, one of which projections, as $b^6$, is located farther from the shaft $b$ than the other projection, $b^5$. The retaining device $b^3$ likewise consists of an arm secured to the shaft $b$, having at its outer end two lateral extensions or projections $b^7$ $b^8$ with a narrow space between them, and one of said projections, as $b^8$, is likewise located farther from the shaft $b'$ than the other projection, $b^7$.

The width of the projections $b^5$ $b^6$ with the space between them is substantially the same as the width of the projections $b^7$ $b^8$ with the space between them; but the said spaces are differently positioned—as, for instance, the space between the projections $b^5$ $b$ is quite near the forward end, so that the projection $b^5$ is wider than the projection $b^6$, while the space between the projections $b^7$ $b^8$ is quite near or substantially at the middle, so that the said projections $b^7$ $b^8$ will be about the same width.

The retaining devices $b'$ $b^2$ $b^3$ radiate in slightly-different directions from the shaft $b$, and said shaft is designed to be partially rotated step by step, as will be described, or otherwise, so that when in its normal position (see Fig. 3) the retaining device $b'$ will permit the pins $a^8$ of the drum $a$ to escape, while at the same time one of the pins $a^8$ on the drum $a'$ will bear upon the projection $b^6$ of the retaining device $b^2$, and one of the pins $a^8$ of the drum $a^2$ will bear upon the projection $b^8$ of the retaining device $b^3$.

When the shaft $b$ has been advanced one step in the direction of the arrow 2, the pins $a^8$ of the drum $a$ will be obstructed by the projection $b^4$ of the retaining device $b'$, and the pins $a^8$ of the drum $a'$ will pass freely through the space between the projections $b^5$ $b^6$ of the retaining device $b^2$; but the pins $a^8$ of the drum $a^2$ will still bear upon the projection $b^8$ of the retaining device $b^3$, but at a point nearer the space between the projections $b^7$ $b^8$ than before. When the shaft $b$ is advanced still farther or passes on to the next succeeding step, the pins $a^8$ of the drum $a$ will still bear upon the projection $b^4$ of the retaining device $b'$, the pins $a^8$ of the drum $a'$ will be obstructed by and bear upon the projection $b^5$ of the retaining device $b^2$, and the pins $a^8$ of the drum $a^2$ will pass freely through the space between the projections $b^7 b^8$ of the retaining device $b^3$. When the shaft is still farther turned the pins $a^8$ of the drums will respectively bear upon the projections $b^4 b^5 b^7$, thereby locking all the drums. Hence it will be seen that but one of the spring-actuated drums can operate at a time, all the rest being retained or locked either in their normal or "set-up" positions, as the case may be. A sufficiently strong spiral spring $b^9$ encircles the shaft $b$ at one end to turn it as required, one end of said spring, as herein shown, being attached to a pin fixed to the framework and the other end to a pin fixed to the retaining device $b'$.

To hold the shaft $b$ in one or another of its four different described positions a segment or portion of a disk $c$ is secured to a shaft $c'$, it having one of its sides or faces stepped or notched, and, as herein shown, three steps 3 4 5 are provided, and secured to the shaft $b$ is a downwardly-extended projection or arm $c^2$, having its rear side, which bears upon or co-operates with the stepped segment $c$, stepped or notched, as at 6 7 8, to correspond with the steps or notches of said segment $c$, but oppositely arranged, as shown in Figs. 7 and 10. When the segment $c$ is in one position—such, for instance, as shown in Figs. 1 to 3—the first step 6 of the projection or arm $c^2$ will bear against the segment $c$ opposite the first step 3 thereof, and when said segment $c$ has been turned with its shaft $c'$ sufficiently it permits the said first step 6 to slip over or by the step 3, at which time the step 7 will be brought to bear against the segment $c$ opposite the step 4, and when said segment $c$ has been still farther turned the step 7 will slip by or over the step 4 and the step 8 will be brought to bear against the segment $c$ opposite the step 5, and when the said segment $c$ has been still farther turned the step 8 will slip by or over the step 5, and at such time further movement of the segment will be checked by a pin 9 thereon striking against a fixed part of the framework. The movement of the arm $c^2$, and hence the shaft $b$, to which it is attached, is checked by a projection 12, extending laterally from said arm $c^2$, and likewise striking a fixed part of the framework. Thus it will be seen that the position of the retaining devices and shaft $b$, to which they are connected, whereby it is determined which drum shall operate and which shall be locked, is governed, as herein represented, by the stepped segment $c$. A sufficiently-strong spiral spring $c^3$ encircles the shaft $c'$, acting to turn it, one end of said spring being attached to a fixed pin on the framework and the other end to a pin fixed to an arm $c^4$ secured to the shaft.

To accurately time the movement of the shaft $c'$ and also retard its progress, a retarding device is provided, which is herein represented as an escapement mechanism, comprising a toothed sector $c^5$, formed on the end of the arm $c^4$, which engages a pinion or toothed hub $c^6$, secured to or formed integral with a ratchet-wheel $c^7$, journaled in suitable bearings, and a pawl $c^8$, which engages said ratchet-wheel $c^7$, which is secured to an escape-wheel $c^9$, also provided with suitable bearings, and a pallet $c^{10}$, which co-operates with said escape-wheel, secured to a pallet-shaft $c^{12}$, having suitable bearings and provided with an adjustable weight. In lieu of this form of retarding device or timing mechanism any other usual or suitable form may be employed whereby the same results are accomplished—viz, retarding the advancing or progressive movement of the shaft, yet permitting it to be turned backward unrestrained.

The retarding device is timed to run a predetermined length of time, and as it is necessary to so control the movement of the segment $c$ that it shall move a certain distance—as, for instance, one step—during a certain length of time, and that this time shall be reckoned as between the last impulse of one group or succession of impulses which set up a figure and the first impulse of the next group or succession of impulses which set up the next figure of the number, means are provided for setting the shaft $c'$ back on each impulse of a group or succession of uninterrupted impulses, and permit it to turn unimpeded during the time between each group or succession of impulses. As a simple way of carrying out this part of our invention we have secured to the shaft $c'$ three arms $d$ $d'$ $d^2$, which extend rearwardly, but which radiate in different directions from the shaft, and said arms are so arranged on the shaft, and are made long enough to obstruct the path of movement of the pins $a^8$ on the several drums, as best shown in Fig. 3, but not long enough, however, to bear against said pins when the drums are at rest. On one of the drums, as $a$, an additional pin 20 is secured, which is so positioned as to serve as a stop for the arm $d$ when said drum $a$ is in its normal position of rest. This stop 20 normally holds the shaft $c'$ against the tension of its actuating-spring, and also holds the retarding device or timing mechanism normally wound.

With the parts in their normal position, as represented in Figs. 1 to 3, the arm $d$ bears against the pin 20, and the retaining device $b'$ is in position to allow the drum $a$ to be let off, and the let-off $e$ for said drum alone holds it. As the armature vibrates the let-off $e$ permits the drum to advance step by step, and the pin 20 being removed from engagement with the arm $d$, said arm immediately rises, but as the drum advances rapidly the said arm will have but little time to rise before the first pin $a^8$ strikes it, restoring it to its normal position, turning the shaft $c'$ backward or in a direction opposite to that in which it is being turned by the actuating-spring $c^3$.

The arm $d$ being successively restored by the pins $a^8$ is prevented from rising but a short distance at a time until the drum ceases to rotate, and at such time the drum is temporarily held by the detent $e$ of the let-off $e$ engaging one of the pins $a^8$, while the arm $d$ rises unobstructed, thereby permitting the shaft $c'$ to be turned forward by its actuating-spring $c^3$ until the segment $c$ has been moved one complete step. The shaft $b$ carrying the retaining devices is then permitted to turn one step, bringing the retaining device $b'$ beneath one of the pins $a^8$ of the drum $a$, thereby locking it and at the same time moving the retaining device $b^2$ far enough to release the drum $a'$, at which time said drum $a'$ will be held only by the detent $e'$ of the let-off $e$ for said drum. As the drum $a'$ rotates intermittingly in the same manner as the drum $a$ in response to the vibrations of the armature, the pins $a^8$ thereon, striking the arm $d'$, successively depress it, setting back the shaft $c'$ to the second step, and as soon as said drum $a'$ ceases to rotate it will be held by the detent $e'$ while the arm $d'$ rises unobstructed, permitting the shaft $c'$ to be turned forward by its actuating-spring another step. The shaft $b$ is thereby permitted to turn another step, bringing the retaining device $b^2$ beneath one of the pins $a^8$ of the drum $a'$, thereby locking it and at the same time moving the retaining device $b^3$ far enough to release the drum $a^2$, at which time said drum will be held only by the detent $e'$ of the let-off $e$ for said drum. As the drum $a^2$ rotates in response to the vibrations of the armature, the pins $a^8$ thereon, striking the arm $d^2$, successively depress it, setting back the shaft $c'$ to the third step, until said drum $a^2$ ceases to rotate, when the arm $d^2$ rises unobstructed, permitting the shaft $c'$ to be turned forward until the segment $c$ has moved another complete step. The shaft $b$ is then allowed to turn another step, bringing the retaining device $b^3$ beneath one of the pins $a^8$ of the drum $a^2$, locking it. The shaft $c'$ then continues to rotate until the pin 9 strikes a fixed part of the framework. Hence it will be seen that the retaining devices $b'$ $b^2$ $b^3$, which determine which drum shall operate, and which also retain or lock all the remaining drums either in their normal position of rest or set-up, as the case may be, are time-controlled, and furthermore that said timing mechanism is held normally wound by one of the drums, and also operated or wound up by the drums while rotating intermittingly.

By placing the retarding device or timing mechanism entirely under the control of the drums, as herein shown, but little work is left to be performed by the electromagnet. To prevent the drums from making a complete revolution, a pin 21 (see dotted lines, Fig. 3) is secured to each drum, which pins strike fixed projections 22 on the framework.

A number having been set up as above described, means are provided for restoring all the parts to their normal position of rest. To carry out this part of our invention a toothed rack-bar $n$ is vertically arranged in suitable bearings in the framework, to the lower end of which a cord or rope is attached, by means of which it may be pulled down, and a strong spiral spring $n'$ is connected at one end to the framework and at the other end to said rack-bar, which restores it to its normal position after it has been pulled down. The rack-bar $n$ engages a pinion $n^2$, loosely mounted on a shaft $a^4$, upon which the drums are sleeved, and a pin $n^3$ projects laterally from said pinion, which enters the cut-away or recessed portion of a collar $n^4$ secured to the shaft, so that as the rack-bar is pulled down and the pinion thereby revolved the collar and consequently the shaft $a^4$ will be rotated. At required points on the shaft $a^4$ short arms $n^5$ (see Fig. 6) are secured, which are made alike and radiate from the shaft in the same direction. Each drum $a$ $a'$ $a^2$ has on it a pin $n^6$, (see dotted line, Fig. 3,) and said arms $n^5$ are so arranged as to engage said pins when the shaft $a^4$ is turned. When the rack-bar is pulled down and the shaft $a^4$ revolved the short arms $n^5$ carried by it engage said pins wherever they may be and return the drums to their normal position of rest, winding up the actuating-springs. As the rack-bar is returned to its normal position the shaft $a^4$ will be turned backward until the short arms $n^5$ strike against fixed pins $n^7$ projecting from the framework.

By referring to Fig. 3 the arrow 25 shows the direction of motion of the short arms when moved to engage the pins and restore the drums. An arm $m$ is pivoted to the framework at $m'$, and a short arm $m^2$ is secured to said pivot $m'$, the outer end of which enters a recess formed in the rack-bar $n$ when the latter is in its elevated position, and when pulled down the said short arm in passing out of said recess is depressed, as shown in Fig. 4, returning, however, to its normal position when the rack-bar is restored to its normal position and a projection $m^3$ thereon strikes it. The arm $m$ is made long enough so that its outer rounded or convexed end will strike the lateral extension 12 on the arm $c^2$ when depressed and thereby restore the retaining devices to their normal position, and said arm $m$ has formed on it a projecting cam $m^4$, which when the arm is depressed strikes the pin 9 on the stepped segment, operating to restore said segment, and consequently the retarding or timing mechanism, to their normal positions.

As the drums $a$ $a'$ $a^2$ are restored to their normal positions by the short arms $n^5$, as described, the pins $a^8$ on said drums will pass by the detents on the let-offs, vibrating the let-offs in their passage, but owing to the flexible or loose connection by means of which the armature of the electromagnet is connected with the shaft carrying the let-offs the said armature will remain in its attracted position. This is of particular advantage, as it obviates the necessity of pulling away the armature successively from the energized magnet. Thus it will be seen that all the parts are restored to their normal positions of rest by simply pulling down the rack-bar $n$.

To prevent the pins $a^8$ striking the retaining devices on the rebound of the drums when restored, we have provided a shunt-switch $w$ for the electromagnet, which is closed by a pin $w'$ on the rack-bar $n$ just as said bar reaches its lowermost position, so that at such time the armature of the electromagnet will be retracted and said pins will be caught and held by the detents $e^2$ just before striking the retaining devices, and as said rack-bar is returned to its normal position said shunt-switch is opened and the armature attracted, when the pins $a^8$, held by the detents $e^2$, will be released and held by the detents $e'$, thereby relieving said retaining devices of any shock. If desired, the said loose connection by means of which the armature is connected to the shaft carrying the let-offs may be omitted, but in such case some means should be provided for releasing the armature of the electromagnet, as the attractive force of said magnet is very strong, and hence by referring to Fig. 11 a shunt-switch is provided which as the rack-bar is pulled down closes a short circuit around the magnet, thereby releasing its armature or permitting it to be moved with freedom.

While the particular means herein shown for controlling the successive operation of the drums is simple and efficient, yet so far as its connection with the first drum to operate is concerned, whereby it is caused or permitted to operate by the first movement of said drum in response to the first impulse received, it may be otherwise constructed. The lever $d$ of said timing mechanism serves as the releasing or controlling lever therefor, yet said timing mechanism may be normally wound—as by a key, for instance—and let off by the lever $d$, which is controlled, as aforesaid, by the first drum to operate.

We claim—

1. In an electric visual indicator, several spring-actuated intermittingly, and successively operating indicating-surfaces, and an electromagnet controlling their intermittent operation, combined with a single timing mechanism controlling their successive operation, the releasing or controlling lever of which is released or caused to operate by that indicating-surface, which operates in response to the first impulse received, substantially as described.

2. In an electric visual indicator, several spring-actuated independently-operating indicating-surfaces, and let-offs therefor controlled by an electromagnet, combined with a normally-wound timing mechanism for determining which indicating-surface shall operate, the releasing or controlling lever of which is governed by that indicating-surface which first operates in response to a change in the condition of the circuit, whereby said timing mechanism is released by said indicating-surface, substantially as described.

3. In an electric visual indicator, several spring-actuated successively-operating indicating-surfaces, and let-offs therefor controlled by an electromagnet, combined with a normally-wound timing mechanism which determines the successive operation of said indicating-surfaces, the releasing or operating lever of which is governed by that indicating-surface which first responds to a change in the condition of the circuit, whereby said timing mechanism is released by said indicating-surface, and restoring or winding-up levers for said timing mechanism operated by the several indicating-surfaces, substantially as described.

4. In an electric visual indicator, several spring-actuated successively-operating indicating-surfaces, and simultaneously-operating let-offs therefor controlled by an electromagnet, combined with a timing mechanism which determines the successive operation of said indicating-surfaces, and restoring or winding devices therefor operated by the several indicating-surfaces, substantially as described.

5. In an electric visual indicator, several spring-actuated intermittingly, and independently movable indicating-surfaces, an electromagnet controlling their operation, combined with a timing mechanism for determining which indicating-surface shall operate, which is engaged and held in its normal wound condition by one of the indicating-surfaces, substantially as described.

6. In an electric visual indicator, the combination of several spring-actuated indicating-surfaces, retaining devices for normally holding them against the tension of their actuating-springs, a single independent train of mechanism governing the operation of said retaining devices, and thereby controlling the successive action of said indicating-surfaces, a series of simultaneously-operating let-offs for said indicating-surfaces, and an electromagnet controlling the operation of said let-offs, substantially as described.

7. In an electric visual indicator, the combination of several spring-actuated indicating-surfaces, a corresponding number of retaining devices on a shaft for normally holding them against the tension of their actuating-springs, a single time-controlled mechanism governing the operation of said shaft and thereby the successive operation of said retaining devices whereby the said indicating-surfaces are permitted to operate one at a time, and the remaining indicating-surfaces being retained, and a series of simultaneously-operating let-offs for said indicating-surfaces, and an electromagnet controlling the operation of said let-offs, substantially as described.

8. In an electric visual indicator, the combination of several spring-actuated indicating-surfaces, successively-operating retaining devices therefor, which permit but one indicating-surface to operate at a time and thereafter lock it, a step-by-step device controlling the operation of said retaining devices, a single independent time-controlled mechanism for said step-by-step device, a series of simultaneously-operating let-offs for said indicating-surfaces, and an electromagnet controlling their operation, substantially as described.

9. In an electric visual indicator, several spring-actuated indicating-surfaces, provided each with a series of pins, combined with a retaining device for each indicating-surface co-operating with the pins thereon, a shaft to which said retaining devices are secured, a step-by-step device which determines the position of said shaft and the retaining devices thereon, a time-controlled mechanism for said step-by-step device, a let-off for each indicating-surface, and an electromagnet controlling the operation of said let-offs, substantially as described.

10. In an electric visual indicator, several spring-actuated indicating-surfaces, independently-operating retaining devices therefor, which permit one of said indicating-surfaces to operate at a time, combined with a step-by-step device controlling the operation of said retaining devices, time-controlled mechanism for said step-by-step device, held in its normal wound condition by one of the indicating-surfaces, a restoring device for said timing mechanism, operated by the indicating-surfaces to restore it to its normal wound condition, let-offs for the indicating-surfaces, and an electromagnet controlling the operation of said let-offs, substantially as described.

11. In an electric visual indicator, several spring-actuated indicating-surfaces, successively-operating retaining devices therefor, which permit one of said indicating-surfaces to operate at a time, combined with a step-by-step device controlling the operation of said retaining devices, a time-controlled mechanism for said step-by-step device, a restoring device for said timing mechanism operated by the indicating-surfaces, to restore it to its normal wound condition, let-offs for the indicating-surfaces, and an electromagnet controlling the operation of said let-offs, substantially as described.

12. In an electric visual indicator, several spring-actuated indicating-surfaces, successively-operating retaining devices therefor, which permit one of said indicating-surfaces to operate at a time and thereafter lock it, combined with a step-by-step device for said retaining devices comprising a stepped segment on a spring-actuated shaft, a retarding device for retarding the progress of said shaft in one direction, but permitting it to be turned backward unrestrained, means for turning said shaft backward and restoring the retarding device actuated by the said indicating-surfaces, a series of simultaneously-operating let-offs for said indicating-surfaces, and an electromagnet controlling their operation, substantially as described.

13. In an electric visual indicator, several spring-actuated indicating-surfaces, successively-operating retaining devices therefor, which permit one of said indicating-surfaces to operate at a time, a step-by-step controller for said retaining devices which determines their position, and a stop-pin as 9, on one member of said step-by-step controller, a retarding device for said step-by-step controller retarding its progress in one direction, but permitting it to be set backward unrestrained, a series of restoring devices for said step-by-step controller operated by the indicating-surfaces, a series of simultaneously-operating let-offs for said indicating-surfaces, and the electromagnet controlling their simultaneous operation, substantially as described.

14. In an electric visual indicator, a series of spring-actuated indicating-surfaces, each provided with a series of pins, combined with retaining devices for said indicating-surfaces, which co-operate with said pins, and permit one indicating-surface to operate at a time, a step-by-step device determining the position of said retaining devices, comprising a stepped segment secured to a spring-actuated shaft, a series of arms radiating in different directions from said shaft, one for each indicating-surface, and so positioned as to co-operate with the pins thereon, a retarding device for said shaft which retards its progress in one direction, but permits it to be turned backward unrestrained, a series of simultaneously-operating let-offs for said indicating-surfaces, and an electromagnet controlling their operation, substantially as described.

15. In an electric visual indicator, several spring-actuated indicating-surfaces, provided each with a series of pins, a retaining device for each indicating-surface, consisting of an arm secured to a spring-actuated shaft and having a broad extension at its outer end, each differently arranged to permit one indicating-surface to operate at a time, and thereafter retain it, a stepped arm on said shaft, a stepped segment upon which said stepped arm bears, a spring-actuated shaft carrying said stepped segment, a timing mechanism for said shaft, a series of let-offs for said indicating-surfaces, and an electromagnet controlling their operation, substantially as described.

16. In an electric visual indicator, several spring-actuated and intermittingly-movable indicating-surfaces sleeved on a shaft, combined with a pinion on said shaft, a rack-bar for rotating it, a connection between said pinion and shaft whereby the shaft may be turned in each direction, and fingers on said shaft which engage pins on the indicating-surfaces for restoring them, substantially as described.

17. In an electric visual indicator, several spring-actuated indicating-surfaces, retaining devices for normally holding them against the tension of their actuating-springs, controlling mechanism for said retaining devices, and a series of simultaneously-operating let-offs for said indicating-surfaces, and an electromagnet controlling the operation of said let-offs, combined with an arm $m$, for restoring the retaining devices, and a pull-bar for moving said arm $m$, substantially as described.

18. In an electric visual indicator, several spring-actuated indicating-surfaces, retaining devices for normally holding them against the tension of their actuating-springs, a time-controlled step-by-step device governing the operation of said retaining devices, a series of let-offs, an electromagnet for moving them simultaneously, combined with a restoring device for said time-controlled step-by-step device, substantially as described.

19. In an electric visual indicator, several spring-actuated indicating-surfaces, retaining devices for normally holding them against the tension of their actuating-springs, a time-controlled step-by-step device governing the operation of said retaining devices, a series of let-offs, and an electromagnet for moving them simultaneously, combined with the arm $m$ having a cam-faced projection $m^4$, for restoring the said time-controlled step-by-step device, substantially as described.

20. In an electric visual indicator, several spring-actuated intermittingly, and independently operating indicating-surfaces, let-offs therefor, and an electromagnet controlling the operation of said let-offs, combined with a restoring device for said indicating-surfaces, a normally-open shunt-switch, controlling a shunt for said electromagnet, which is closed by said restoring device for the indicating-surfaces, substantially as described.

21. In an electric visual indicator, several spring-actuated intermittingly, and independently operating indicating-surfaces, let-offs therefor, having two detents, an electromagnet controlling the operation of said let-offs, whereby one or the other detent is brought into operative position according to the position of the armature of said magnet, combined with a shunt-switch for said magnet, and means for closing it controlled by the restoring mechanism, substantially as described.

In testimony whereof we have signed our names to this specification in the presence of two subscribing witnesses.

FREDERICK W. COLE.
WINTHROP M. CHAPMAN.

Witnesses:
BERNICE J. NOYES,
LUCY F. GRAVES.